United States Patent [19]

Mucaria

[11] 4,368,226
[45] Jan. 11, 1983

[54] GLASS UNITS

[76] Inventor: Gasper Mucaria, 1577 E. 21 St., Brooklyn, N.Y. 11210

[21] Appl. No.: 177,590

[22] Filed: Aug. 13, 1980

[51] Int. Cl.³ .............................................. E06B 3/24
[52] U.S. Cl. ..................................... 428/34; 52/309.3; 52/309.13; 52/788; 52/789; 52/790; 89/36 L; 428/412; 428/437; 428/911; 428/122
[58] Field of Search ................ 428/437, 34, 412, 911, 428/122; 52/788–790, 309.3, 309.13; 89/36 L

[56] References Cited

U.S. PATENT DOCUMENTS

| | | | |
|---|---|---|---|
| 3,783,084 | 1/1974 | Quentt | 428/34 |
| 3,837,129 | 9/1974 | Losell | 428/34 |
| 4,011,356 | 3/1977 | Lambert | 428/437 |
| 4,047,351 | 9/1977 | Derner | 428/34 |

FOREIGN PATENT DOCUMENTS 2061569 6/1972 Fed. Rep. of Germany ...... 428/911

*Primary Examiner*—Ellis P. Robinson
*Attorney, Agent, or Firm*—Evelyn M. Sommer

[57] ABSTRACT

A glass unit includes inner and outer glass panels, a central plastic panel separated from the opposing surfaces of the inner and outer glass panels, the central panel having an outer periphery, a U-shaped channel extending around said outer periphery and having first and second legs which straddle and only partially overlap the opposing surfaces of the central panel and a base which is spaced away from the outer periphery of the central panel.

5 Claims, 1 Drawing Figure

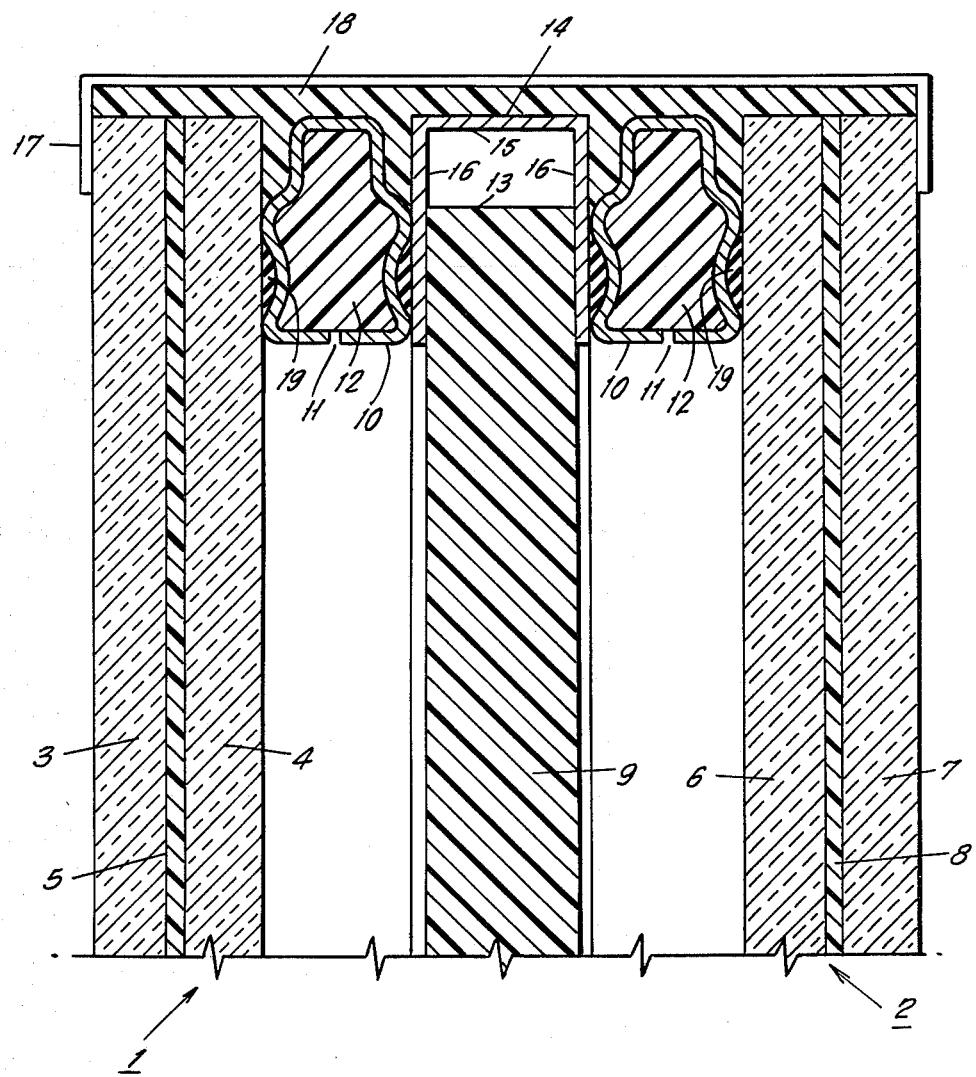

GLASS UNITS

BACKGROUND OF THE INVENTION

It has become conventional to employ glass laminates instead of glass for such applications as window panes, windshields for automobiles and other motor vehicles and the like. Since glass breaks easily and shatters while breaking, it presents a substantial risk of serious injury.

Many types of laminated glass are known in the prior art. One type includes two or more sheets of glass bonded together by means of an elastomeric interlayer material. Polyvinyl butyral is commonly used as the interlayer because of its adhesion to glass when subjected to suitable termperatures and pressure, because it is transparent when bounded between two sheets of glass, and because of its resistance to elongation whenever an object impacts such a laminated glazing. Other interlayer materials employed include polyurethane compositions which are sometimes introduced as partial polymers and sometimes cast in place.

Another type of glass laminate is the combination of a polycarbonate and glass. The polycarbonates are especially advantageous because of their high rigidity, high impact strength and stability under load at temperatures from well below $-100°$ C. to as high as $150°$ C. and above. Additionally, there is very little light absorption by the polycarbonate layer of a safety pane coupled with high ultraviolet light and infrared radiation absorptions. One difficulty in polycarbonate laminates arises from the fact that the glass and polycarbonate have different coefficients of thermal expansion and therefore expand at different rates. It is suggested in U.S. Pat. No. 3,821,071 to mount the polycarbonate and glass sheets slidably against one another in face-to-face relationship in a frame. While this arrangement overcomes some of the problems, it is not entirely satisfactory.

Accordingly, it is the object of this invention to provide a new glass unit which includes one or more polycarbonate layers and which avoids the problems inherent in the differential heat expansion rates of glass and the plastic material. This and other objects of the invention will become apparent to those skilled in the art from following detailed description in which the sole figure is a cross-section of a glass unit constructed in accordance with this invention.

SUMMARY OF THE INVENTION

This invention relates to a glass unit and more particularly to a safety glass unit in which a central polycarbonate sheet is surrounded by and spaced apart from glass sheets and one or more of the peripheral edges of the polycarbonate sheet lies within a channel which, in turn, provides room for lateral expansion of the polycarbonate sheet.

DESCRIPTION OF THE INVENTION

The sole FIGURE shows a section of a glass unit constructed in accordance with the present invention. The unit includes first and second layers of glass 1, 2 which are usually, but not necessarily, positioned so that the opposing faces of layers 1 and 2 are substantially parallel. While each of layers 1 and 2 could be a unitary glass body, it is preferred that each layer itself be a safety glass laminate. Thus, layer 1 is preferably constructed of a first and second glass layer 3,4 bonded together by an interlayer of polyvinyl butyral 5. Similarly, layer 2 is preferably composed of two glass panes 6, 7 interconnected and bonded together by an interlayer of polyvinyl butyral 8. Typically, glass panels 3,4,6, and 7 have a thickness of about 0.125 inch but can range up to 0.375 inch and interlayers 5 and 8 have a thickness of about 0.03 inch and can range up to 0.06 inch.

A polycarbonate sheet 9 is positioned between layers 1 and 2 such that each lateral surface of polycarbonate layer 9 is substantially parallel to the lateral face of the adjacent surface of glass layer 1 or 2. Any suitable polycarbonate material can be use in the present invention. For example, some of the suitable plastics are prepared by reacting di(monohydroxaryl) alkanes with carbonic acid derivatives such as diesters, phosgene or bischlorocarbonic acid esters of di(monohydroxyaryl) alkanes. Suitable polycarbonates and processes for their production are described in, inter alia U.S. Pat. Nos. 3,028,365; 2,999,846; 2,970,131; 2,991,271; 2,999,835; 3,014,891; 3,248,414, Chemistry and Physics of Polycarbonates by Schnell and Polycarbonates by Christopher and Fox.

Polycarbonate layer 9 is maintained apart from i.e., spaced apart from the adjacent glass layers 1 and 2 by means of any suitables spacers such as, for example, aluminum spacers 10. Spacers 10 preferably have a hollowed out interior which communicates with the area between polycarbonate layer 9 and adjacent glass layers 1 or 2 by means of a channel 11 so that the interior of spacer 10 can be packed with a suitable desiccant 12 such as silica gel. In the preferred embodiment of this invention, the thickness of polycarbonate layer 9 is approximately 0.25 inch and the distance between the lateral face of layer 9 and the adjacent face of glass layers 1 or 2 is about 0.1875 inch so that the entire unit has a thickness of about 1.185 inches. The distance between the lateral face of layer 9 can range up to 0.5 inch and the entire unit thickness can be up to 1.5 inches.

At least one and preferably all of the peripheral or marginal edges 13 of polycarbonate sheet 9 is provided with a substantially U-shaped capping channel 14. Capping channel 14 has a substantially flat base 15 and two integral lateral walls 16 each of which partially contact one face of polycarbonate sheet 9. Capping channel 14 thus straddles marginal edge 13 of polycarbonate sheet 9. Additionally, marginal edge 13 of polycarbonate sheet 9 is spaced apart form said flat base 15 of capping channel 14 by a given dimension to permit lateral expansion of the polycarbonate. In the preferred embodiment of this invention the given dimension is about 0.125 inch. Capping channel 14 can be constructed of any suitable material such as, but not limited to, stainless steel.

The spatial relationship of glass layers 1 and 2 polycarbonate layer 9 and spacers 10 is maintained substantially constant by use of a suitable framing means 17. Framing means 17 can be in the form of a metal channel of U-shaped cross-section or an adhesive tape or a rigid plastic member (e.g. polyvinyl chloride) or other suitable material. The framing means can also be of a thermal non-conducting material and construction such as described, for example, in U.S. Pat. No. 4,030,263.

The area between framing means 17 on the one hand and glass layers 1 and 2, capping channel 14, and spacers 10 is filled with an appropriate sealant 18. Polysulfide sealants have been found particularly appropriate.

Preferably a second sealant for instance made of butyl rubber is provided, as shown by reference numeral 19.

The butyl rubber serves as a vapor and/or gas barrier. The polysulfide sealant 18 serves most advantageously as protection against weathering.

The glass units of the invention find particular application as installation units where security is of prime importance, as for example, in hospitals, for example, mental hospitals, prisons and correctional facilities, banks, jewelry stores, and the like. As can be appreciated the units can be modified to include alarm systems. The glass can be conventional clear or colored glass as well as photosensitive glass.

The units can be made in any size depending on the intended application and/or builder or architect's specification.

Various changes and modifications can be made in the glass unit of the present invention without departing from the spirit and scope thereof. The various embodiments described herein have been for the purpose of further illustrating the invention but were not intended to limit it.

I claim:

1. A glass unit, comprising in combination, first and second sheets of glass, a polycarbonate sheet between said first and second sheets of glass disposed such that each lateral face thereof is substantially parallel to the lateral face of the adjacent first or second glass sheet; means for spacing apart the respective opposing faces of said polycarbonate sheet and said first and second sheets of glass; a substantially u-shaped capping channel comprising a substantially flat base and two flat lateral walls straddling the marginal edge of said polycarbonate sheet each of said lateral walls partially contacting one face of said polycarbonate sheet; the marginal edge of said polycarbanate sheet being spaced apart from said flat base by a given dimension, each of said lateral walls completely contacting one face of said polycarbonate sheet other than in the area of the space formed between said flat base and said marginal edge of said polycarbonate sheet, said means for spacing apart the respective opposing faces of said polycarbonate sheet and said first and second sheets of glass being located in the area of said u-shaped capping channel, said spacing means having hollowed out interiors which communicate with the area between the polycarbonate sheet and adjacent glass sheets by means of a channel, said hollowed out interiors being packed with a dessicant; and framing means for maintaining the spatial relationships of said first and second glass sheets and polycarbonate sheet substantially constant.

2. The glass unit of claim 1, wherein each of said first and second sheets of glass comprise two layers of glass bounded to an interlayer of polyvinyl butyral.

3. The glass unit of claim 1, wherein the area defined by said framing means, first and second sheets of glass, means for spacing apart and said capping channel contains a sealant.

4. The glass unit of claim 3, wherein each of said first and second sheets of glass comprises two layers of glass bonded to a polyvinyl butyral interlayer.

5. The glass unit of claim 2, wherein the area defined by said framing means, first and second sheets of glass, means for spacing apart and capping channel contains a sealant.

* * * * *